Figure 1:
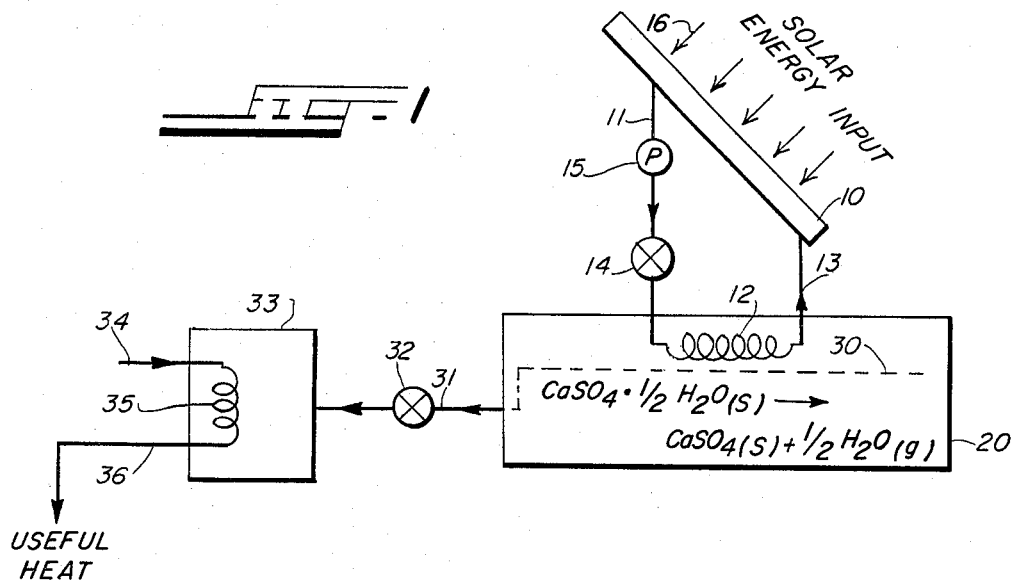

United States Patent [19]

Pangborn

[11] 4,303,121
[45] Dec. 1, 1981

[54] ENERGY STORAGE BY SALT HYDRATION

[75] Inventor: Jon B. Pangborn, Lisle, Ill.

[73] Assignee: Institute of Gas Technology, Chicago, Ill.

[21] Appl. No.: 899,377

[22] Filed: Apr. 24, 1978

[51] Int. Cl.³ ............... F28F 00/00; F28D 13/00; F24H 7/00; F24J 1/00
[52] U.S. Cl. ............... 165/1; 165/104.12; 126/400; 126/263
[58] Field of Search ............... 126/430, 436, 452, 400, 126/373, 204, 263; 165/DIG. 4, DIG. 17, 104 S, 1, 2; 236/1 A; 423/555, DIG. 6; 252/70

[56] References Cited

U.S. PATENT DOCUMENTS

| 2,856,506 | 10/1958 | Telkes | 126/400 |
| 4,146,057 | 3/1979 | Friedman | 126/436 |
| 4,153,047 | 3/1979 | Dumbeck | 126/436 |

OTHER PUBLICATIONS

P. G. Grodzka, 'Some Practical Aspects of Thermal Energy Storage', Proceedings of the Workshop on Solar Energy Storage Subsystems for Heating and Cooling of Buildings, 1975, Am. Soc. of Heating, Refrigeration and Air Cond. Engrs. Inc., pp. 68–71.

*Primary Examiner*—Samuel Scott
*Assistant Examiner*—G. Anderson
*Attorney, Agent, or Firm*—Thomas W. Speckman

[57] ABSTRACT

A process and apparatus for energy storage wherein thermal energy from solar or waste heat derived sources is passed in thermal exchange relation with a hydrated inorganic salt, such as calcium sulfate, endothermically dehydrating the salt thereby storing chemical energy and releasing the stored energy as heat by passing water under hydration conditions in contact with the salt exothermically hydrating the salt. The released thermal energy is substantially isothermal and available for any desired use involving thermal energy input. The process and apparatus of this invention is particularly suited to utilization of solar derived thermal energy.

8 Claims, 2 Drawing Figures

ENERGY STORAGE BY SALT HYDRATION

This invention relates to a process and apparatus for acceptance and release of thermal energy wherein the thermal energy to be stored is passed in thermal exchange relation with a hydrated inorganic salt endothermically dehydrating the salt thereby storing chemical energy and releasing the stored energy as heat by passing water under hydration conditions in contact with the salt exothermically hydrating the salt. The released thermal energy is then available for any desired use involving thermal energy input.

In order to utilize solar derived thermal energy and chemical process or other waste thermal energy, it is necessary to provide a system and process for the economical and efficient storage of such thermal energy which can deliver the thermal energy on demand, nearly isothermally and not severely degraded in temperature. A number of such heat storage proposals have been considered but each have had disadvantages.

A number of sensible heat storage systems have been investigated. See *Proceedings of the Workshop on Solar Energy Storage Sub-systems for the Heating and Cooling of Buildings.* L. U. Lilleleht, et al., NSF-RA-N-75-041, Charlottesville, Vir., Apr. 16-18, 1975, for example. The sensible heat storage systems all suffer disadvantages including the delivery of non-isothermal heat rendering a variable operating condition for any use of such heat. Many of the fluid storage media for sensible heat storage systems which appear economically feasible, are hazardous due to flammability or toxicity, especially in the provision of such heat at moderately high temperature conditions where volatility is increased.

Several systems have been proposed involving reversible chemical or physical reactions. One proposed system utilizing chemical energy is the reaction of calcium oxide with water to form calcium hydroxide and chemically decomposing the calcium hydroxide utilizing heat input to convert the calcium hydroxide back to calcium oxide as is more fully described in U.S. Pat. No. 3,955,554. Another proposed thermal storage technique is utilization of the heat of fusion as suggested by U.S. Pat. Nos. 3,986,969 and 4,008,758. Yet another attempt at the storage and retrieval of solar thermal energy is the use of reversible photochemical isomerization as more fully described in U.S. Pat. No. 4,004,572. Attempts to utilize the heat of transition released when a crystalline solid changes from one crystalline form to another as a method for storing and releasing heat is more fully described in U.S. Pat. No. 2,856,506. These methods for storage of thermal energy have not been entirely satisfactory for many reasons including cost, corrosion, toxicity considerations, lack of desired reaction kinetics and provision of recovered thermal energy at too wide a temperature range.

It is an object of this invention to overcome the disadvantages of the prior art processes for the storage and recovery of thermal energy.

It is another object of this invention to provide an apparatus and process for storage of solar-derived thermal energy which can provide primarily isothermal heat to air conditioning systems.

It is still another object of this invention to provide an energy storage and recovery system which utilizes hydration-dehydration reactions using an inorganic salt hydrate.

It is yet another object of this invention to provide an apparatus and process for use of hydration-dehydration reactions using an inorganic salt hydrate for energy storage and retrieval wherein the storage material is relatively cheap, non-toxic and does not provide a corrosion problem.

It is another object of this invention to provide a process for energy storage and recovery providing thermal energy input and output, but not dependent upon storage of sensible heat.

It is still another object of this invention to provide a process and apparatus for utilization of hydration-dehydration reactions using an inorganic salt hydrate for energy storage providing retrieval of the thermal energy in the range of 200° to 350° F.

Figure 2:
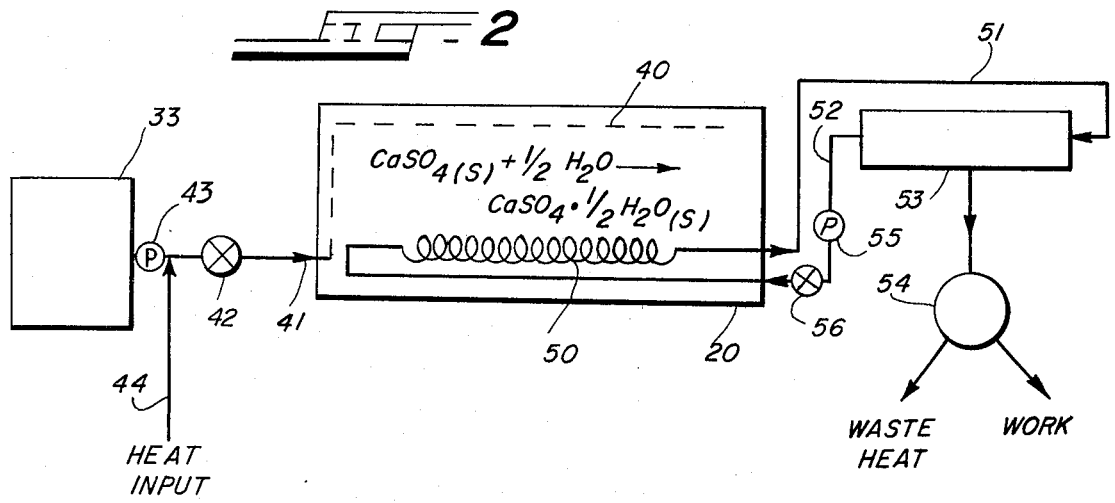

These and other objects of this invention which will become readily apparent to one reading the description when taken in conjunction with the drawings wherein:

FIG. 1 schematically shows a portion of the process and apparatus of one preferred embodiment of this invention in the energy storage mode; and FIG. 2 shows schematically a portion of the process and apparatus of one preferred embodiment of this invention in the energy release mode.

The process of this invention utilizes endothermic dehydration of an inorganic salt hydrate in the energy storage mode and exothermic hydration in the energy release mode. Any chemical hydrate which accepts thermal energy by dehydration at the thermal or waste energy temperature level available is feasible. Generally, the input thermal energy is used to dehydrate the energy storage chemical. The water, generally as steam, may be removed from the energy storage vessel and some thermal energy may be utilized in the condensation of the steam to water. The energy release mode is conducted by hydrating the working chemical with water and removing for use the nearly isothermal heat of hydration. Generally, the input heat provided to the energy storage mode is at a temperature above the equilibrium dehydration temperature for the salt at the system operating pressure. For calcium sulfate at one atmosphere heat would be provided at temperatures of the order of 325° to 400° F. while the heat can be recovered in the energy release mode at about 225° to 325° F. Any inorganic salt which hydrates and dehydrates under similar conditions and which provides high heats of hydration, rapid kinetics, is non-toxic and is non-corrosive to components, is satisfactory for use in the process of this invention. It is highly desirable that the chemical hydrate working material be generally available and relatively inexpensive.

One suitable chemical hydrate working material for use in the process and apparatus of this invention is calcium sulfate. Calcium sulfate is obtained from naturally occurring gypsum or calcium sulfate dihydrate ($CaSO_4 \cdot 2H_2O$). Calcium sulfate is also produced as a by-product of several important chemical processes as well as from stack gas scrubbing plants. In some cases, the produced gypsum cannot even be sold and is being used as a land fill material.

The calcium sulfate dihydrate ($CaSO_4 \cdot 2H_2O$) upon heating, dehydrates to form first the hemihydrate ($CaSO_4 \cdot \frac{1}{2}H_2O$) and finally, the anhydrous salt or anhydrite ($CaSO_4$). The gypsum, when completely dehydrated at temperatures below about 572° F., appears to maintain the same crystal structure and has an extremely low vapor pressure (about 0.005 mm) and a high avidity for the absorption of water. The estimated pore space is about 38 percent by volume. The anhydrite will absorb 6.6 percent of its weight of water forming the stable hemihydrate. It is this hydration-dehydration system which is suitable for use in this invention. Waste heat or solar energy derived heat may be passed in thermal exchange with calcium sulfate hemihydrate in an energy storage vessel at temperatures in the order of 325° to 400° F. The hemihydrate is dehydrated to the anhydrite and steam. The steam may be removed and condensed to water. The energy storage vessel and the steam condensation tank are desirably insulated to also retain the sensible heat. This is the endothermic storage mode which may be chemically described by the equation:

$$CaSO_4 \cdot \tfrac{1}{2}H_2O_{(s)} \rightarrow CaSO_{4(s)} + \tfrac{1}{2}H_2O_{(g)}$$

In the exothermic release mode the anhydrite in the energy storage vessel is contacted with water and the hydration reaction shown as follows takes place:

$$CaSO_{4(s)} + \tfrac{1}{2}H_2O \rightarrow CaSO_4 \cdot \tfrac{1}{2}H_2O$$

The hydration reaction is exothermic and the thermal energy may be withdrawn from the energy storage vessel for any suitable use. The storage capacity of the calcium sulfate hemihydrate is about 5000 calories per gram-mole or about 65 BTU's per pound of hemihydrate.

Thus, it is seen that to provide 1,000,000 BTU storage, about 15,000 pounds of calcium sulfate hemihydrate is required. This quantity would fit into a cube about 5 feet on an edge and provide sufficient thermal energy input for a typical 3-ton air cooling unit operating for a 12-hour period. Thus, it is seen that use of calcium sulfate hydrate provides a practical energy storage material for use in the apparatus and process of this invention.

Calcium sulfate dihydrate may also be used for energy storage in the same manner providing additional endothermic storage according to the chemical equation:

$$CaSO_4 \cdot 2H_2O \rightarrow CaSO_4 \cdot \tfrac{1}{2}H_2O + 3/2 H_2O$$

and additional exothermic release according to the chemical equation:

$$CaSO_4 \cdot \tfrac{1}{2}H_2O + 3/2 H_2O \rightarrow CaSO_4 \cdot 2H_2O.$$

It is seen that the dihydrate represents further hydration than the hemihydrate and thus additional energy storage. By utilization of both the hemihydrate and dihydrate, thermal energy may be obtained at staged temperature conditions and at temperatures between the temperature release of the hemihydrate and the dihydrate by a combination of these forms of hydration. The extent of dihydrate formation may be controlled by control of the exothermic reaction as will be further described.

FIG. 1 shows one preferred embodiment of the energy storage mode of the process and apparatus of this invention using endothermic calcium sulfate hemihydrate dehydration to the anhydrite for energy storage which is followed by exothermic hydration of the anhydrite back to the hemihydrate for release of solar derived thermal energy. Solar collector 10 is any suitable solar energy collecting unit for collection of solar energy input 16. Thermal energy is transferred by a primary heat transfer fluid from solar collector 10 through conduit 11 by pump means 15 to thermal exchange means 12 within energy storage vessel 20. The primary heat transfer fluid may be any suitable high boiling point liquid or gas, such as air, for transfer of the thermal energy at about 350° to 400° F., for calcium sulfate, from solar collector 10 to thermal exchange means 12 and return by conduit 13 to solar collector 10. Presently available solar collectors reach temperatures of up to about 400° F. thereby making temperatures of about 325° to 375° F. attainable in the energy storage vessel. The energy storage vessel contains calcium sulfate hemihydrate for initiation of the energy storage mode. At temperatures of about 325° to 350° F., the calcium sulfate hemihydrate dehydrates to calcium sulfate anhydrite and steam. Provision of 10,000 calories per gram-mole results in about 5,000 calories stored chemically and about 5,000 calories available as steam. The steam is collected by steam collector 30 and passed through steam conduit 31 and steam valve 32 to steam condenser 33 where is is condensed to pressurized water at about 212° to 225° F. Isothermal heat at about 212° F. is rejected from steam condenser 33 and is available for use during the energy storage mode. The useful heat may be withdrawn by heat supply conduit 36 in communication with thermal exchange means 35 which is supplied with suitable heat transfer fluid by input conduit 34. The substantially isothermal (±10° F.) heat available via heat supply conduit 36 may be used to operate an engine or any other suitable heat consuming process. The amount of heat available in this manner represents about one-half of the amount of heat that is stored in the thermal storage vessel. It is desired that energy storage vessel 20 and steam condenser 33 be insulated to retain their sensible heat for use in the energy release mode.

The energy release mode is shown schematically in FIG. 2 utilizing the same energy storage vessel 20 and the steam condenser 33 shown in FIG. 1 becomes the water supply vessel. Pump 43 provides water flow from vessel 33 to control valve 42. For the energy release mode, hot water in the form of atomized droplets or preheated steam is passed through water control valve 42 by water supply conduit 41 to water distributor 40. Additional heat from heat input 44 may be provided to obtain the desired water or steam temperature. Heating means (not shown) to provide heat to heat input 44 may be any suitable heating means, including waste heat from heat engine 54. Water at a temperature of about 175° to 200° F. or steam at about 212° to 250° F. is distributed throughout the calcium sulfate anhydrite in energy storage vessel 20. At temperatures in about the 250° to 300° F. range, the anhydrite hydrates exothermically to the hemihydrate. The heat of hydration is released and transferred to a secondary heat transfer fluid in thermal exchange means 50. The secondary heat transfer fluid passes from energy storage vessel 20 through conduit 51 to thermal exchange means 53 and returns to thermal exchange means 50 within energy storage vessel 20 by conduit 52. Pump 55 and valve 56 are provided to maintain desired flow rate of the secondary heat transfer fluid. The heat release is controlled by the flow rate of the secondary heat transfer fluid which controls the rate of heat extraction and by the flow rate of water into energy storage vessel by valve 42. Valves 42 and 56 may be controlled by a temperature sensing and control means at a suitable location in the energy storage vessel or in the heat removal circuit.

The control of water flow into the energy storage vessel by valve 42 also controls the extent of hydration. The control of water flow into the energy storage vessel is also necessary to prevent flooding and formation of a solid monolith of plaster-of-paris. The heat derived by thermal exchange means 53 may be used to power any type of heat engine 54 resulting in work which may be used for process or space heating or to power an air conditioning cycle and waste heat which may be rejected or otherwise utilized. Air may be used as the secondary heat transfer fluid and directly utilized without thermal exchange means 53. In order to initiate the exothermic hydration reaction, it may be desirable to heat the initial water distributed into energy storage vessel 20 until the exothermic reaction provides sufficient heat to maintain the desired reaction temperature. This heat may be supplied by any suitable means to the water in water supply conduit 41 and is shown in FIG. 2 as heat input 44.

The thermal exchange means used in the apparatus and process of this invention may be any suitable thermal exchange means affording efficient thermal transfer between an internal working fluid and the exterior environment. Presently used thermal exchangers include metallic coil and finned devices. The thermal exchange means 12 and 50 within energy storage vessel 20 are desirably distributed throughout the bed of hydration chemical. Air or other gas may be used as the heat transfer fluid in direct contact with the chemical hydrate working material eliminating one or both of the thermal exchange means within the energy storage vessel.

The inorganic salt energy storage material is packed in the energy storage vessel in a manner to provide good water contact, good heat transfer and to prevent flooding which may lead to monolith formation. Such techniques are known to the art and may include adding an inert material to the bed or partitioning the bed. In the case of calcium sulfate it is desired to use granules and not powder to aid in preventing monolith formation, sizes of about $\frac{1}{8}''$ to $\frac{3}{8}''$ being suitable.

Although FIG. 1 and FIG. 2 show the energy storage material separately to simplify the explanation of the energy storage mode and energy release mode, it should be understood that the same energy storage material is contained in the same energy storage vessel 20 in each figure. Multiple energy storage vessels containing energy storage material may be used in parallel to provide desired thermal withdrawal characteristics.

The term water as used throughout this description and claims is used to include both water in the liquid and vapor or steam conditions.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. A process for energy storage and release comprising the steps of: collecting thermal energy in a first heat transfer fluid; passing said first heat transfer fluid at a temperature of about 325° to about 400° F. in thermal exchange relation with calcium sulfate hemihydrate causing chemical reaction releasing water endothermically dehydrating said calcium sulfate hemihydrate to calcium sulfate anhydrite thereby storing energy; removing said released water from contact with the calcium sulfate anhydrite; passing water in contact with said calcium sulfate anhydrite under conditions to exothermically hydrate said calcium sulfate anhydrite to calcium sulfate hemihydrate releasing stored energy; and passing a second heat transfer fluid in thermal exchange relation with said dehydrated salt collecting released thermal energy at a temperature of about 225° to about 325° F. for desired use.

2. The process of claim 1 wherein thermal energy is released at a substantially isothermal temperature between about 250° to about 300° F.

3. The process of claim 1 wherein said calcium sulfate is in granular form in a bed.

4. The process of claim 1 wherein said second heat transfer fluid is air.

5. The process of claim 1 wherein the hydrating of calcium sulfate anhydrite to calcium sulfate hemihydrate is controlled by the rate of passing said water.

6. The process of claim 5 wherein about 6.6 weight percent water, based upon weight of calcium sulfate anhydrite, is absorbed in said exothermic hydrating reaction.

7. The process of claim 1 wherein said thermal energy to be stored is derived from solar energy source.

8. The process of claim 1 wherein thermal energy is provided to said calcium sulfate hemihydrate at about 325° to about 350° F.

* * * * *